(12) United States Patent
Ando

(10) Patent No.: US 11,841,663 B2
(45) Date of Patent: Dec. 12, 2023

(54) SHEET STORAGE DEVICE AND IMAGE FORMING SYSTEM THEREWITH

(71) Applicant: KYOCERA Document Solutions Inc., Osaka (JP)

(72) Inventor: Yoshihiro Ando, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 53 days.

(21) Appl. No.: 17/678,958

(22) Filed: Feb. 23, 2022

(65) Prior Publication Data

US 2022/0269208 A1 Aug. 25, 2022

(30) Foreign Application Priority Data

Feb. 25, 2021 (JP) ................................ 2021-029052

(51) Int. Cl.
*G03G 15/00* (2006.01)
*H04N 1/00* (2006.01)

(52) U.S. Cl.
CPC ..... *G03G 15/6511* (2013.01); *H04N 1/00557* (2013.01); *H04N 1/00559* (2013.01); *H04N 1/00631* (2013.01)

(58) Field of Classification Search
CPC ........... G03G 15/6511; H04N 1/00557; H04N 1/00559; H04N 1/00631
See application file for complete search history.

(56) References Cited

U.S. PATENT DOCUMENTS

| 4,262,951 | A * | 4/1981 | Hoyer | B66C 1/666 |
| | | | | 294/82.23 |
| 4,768,998 | A * | 9/1988 | Hirose | B62M 9/08 |
| | | | | 474/112 |
| 9,359,157 | B2 * | 6/2016 | Niikura | B65H 1/18 |
| 10,766,721 | B2 * | 9/2020 | Inoue | B65H 7/02 |
| 2006/0055100 | A1 * | 3/2006 | Suzuki | B42C 1/12 |
| | | | | 270/45 |
| 2014/0061993 | A1 * | 3/2014 | Shimura | B65H 31/3027 |
| | | | | 270/58.09 |
| 2015/0130124 | A1 * | 5/2015 | Muto | G03G 15/6508 |
| | | | | 271/9.03 |

(Continued)

FOREIGN PATENT DOCUMENTS

JP 11289882 A * 10/1999
JP 2020-33161 A 3/2020

*Primary Examiner* — David H Banh
(74) *Attorney, Agent, or Firm* — Stein IP LLC

(57) ABSTRACT

A sheet storage device includes a housing, a sheet stacking tray, a shaft, a suspension mechanism, a driving device, and a drive transmission portion. The suspension mechanism includes a plurality of winding pulleys and a plurality of wires. The drive transmission portion includes a plurality of driving gears and a plurality of driven gears. The plurality of winding pulleys permit the engagement positions of the plurality of driven gears with respect to the plurality of driving gears to be changed in the circumferential direction of the shaft. The drive transmission portion changes the respective engagement positions of the plurality of driven gears and thereby changes the respective relative positions of the fixing portions of the plurality of winding pulleys in the rotation direction. This permits adjustment of the respective unwound lengths of the plurality of wires.

7 Claims, 8 Drawing Sheets

(56) References Cited

U.S. PATENT DOCUMENTS

| | | | |
|---|---|---|---|
| 2016/0016740 A1* | 1/2016 | Niikura | B65H 1/266 |
| | | | 271/171 |
| 2016/0185539 A1* | 6/2016 | Ito | B65H 3/06 |
| | | | 271/117 |
| 2018/0111772 A1* | 4/2018 | Yamaguchi | B65H 1/20 |
| 2021/0039898 A1* | 2/2021 | Fujikura | B65H 1/04 |
| 2021/0061594 A1* | 3/2021 | Kimura | B65H 1/14 |
| 2022/0258992 A1* | 8/2022 | Takano | B65H 3/0669 |

* cited by examiner

SHEET STORAGE DEVICE AND IMAGE FORMING SYSTEM THEREWITH

INCORPORATION BY REFERENCE

This application is based on and claims the benefit of priority from Japanese Patent Application No, 2021-029052 filed on Feb. 25, 2021, the contents of which are hereby incorporated by reference.

BACKGROUND

The present disclosure relates to a sheet storage device, and relates also to an image forming system provided with a sheet storage device.

With image forming apparatuses such as copiers, printers, and facsimile machines, in a situation where a single image forming apparatus is shared by a large number of users, increased quantities of sheets (recording media such as printing paper sheets and envelopes) are consumed per image forming apparatus. In general, an image forming apparatus can only store several hundred sheets inside its body, and thus needs to be replenished with sheets frequently. As a remedy, a large-capacity sheet storage device is known that is capable of storing several thousand sheets and that is attached to a side part of an image forming apparatus so that sheets are supplied from the sheet storage device to the image forming apparatus.

Such a sheet storage device includes a sheet stacking tray on which sheets are stacked, a suspension mechanism that suspends the sheet stacking tray, and a driving device that applies a rotative driving force to the suspension mechanism to raise and lower the sheet stacking tray. The suspension mechanism includes a shaft that is supported so as to be rotatable in forward and reverse directions, a plurality of pulleys that are attached to the opposite ends of the shaft in the rotation axis direction, and four wires of which one ends are fixed to the pulleys and of which the other ends are fixed to the sheet stacking tray.

The driving device is connected to the shaft, and applies a rotative driving force to the shaft to make it rotate. The pulleys are restrained from rotating relative to the shaft, and rotate together with the shaft as it rotates. The driving device, by rotating the shaft and pulleys, winds the wires around the pulleys and unwinds the wires from the pulleys, thereby to raise and lower the sheet stacking tray. That is, the unwound length of the wires varies with the number of revolutions of the pulleys.

The other ends of the wires are fixed to fixing portions provided at the four corners of the sheet stacking tray. The fixing portions are disposed such that the center of gravity of the sheet stacking tray overlaps the center of those fixing portions. The unwound length of the wires is equal for all the wires, so that the sheet stacking tray ascends and descends in a state suspended in a horizontal state by the wires.

Above the sheet stacking tray, a sheet feed portion is disposed that feeds sheets from the sheet storage device to the image forming apparatus. With the sheet stacking tray raised such that the top surface of the bundle of sheets stacked on the sheet stacking tray is in contact with the sheet feed portion, the sheet feed portion feeds out the sheet in contact with it to the image forming apparatus.

SUMMARY

According to one aspect of the present disclosure, a sheet storage device includes a housing, a sheet stacking tray, a shaft, a suspension mechanism, a driving device, and a drive transmission portion. The sheet stacking tray is supported inside the housing so as to be able to lift up and down in an ascent-descent direction, and on the sheet stacking tray, sheets are stacked. The shaft extends in a direction orthogonal to the ascent-descent direction, and is supported so as to be rotatable in forward and reverse directions The suspension mechanism includes a plurality of winding pulleys fitted at opposite ends of the shaft and a plurality of wires of which one ends are respectively fixed to the plurality of winding pulleys and of which the other ends are fixed to the sheet stacking tray so as to suspend the sheet stacking tray. The driving device rotates the shaft. The drive transmission portion includes a plurality of driving gears that are respectively fixed at positions corresponding to the plurality of winding pulleys on the shaft and that rotate to with the shaft and a plurality of driven gears that are respectively formed on the plurality of winding pulleys and that are engageable with corresponding ones of the plurality of driving gears. In the drive transmission portion, the plurality of driving gears and the plurality of driven gears engage with each other to transmit the rotation of the shaft to the plurality of winding pulleys. The plurality of winding pulleys have fixing portions to which end parts of the plurality of wires are fixed, and permit the engagement positions of the plurality of driven gears with respect to the plurality of driving gears to be changed in the circumferential direction of the shaft. The drive transmission portion changes the respective engagement positions of the plurality of driven gears, and thereby changes the respective relative positions of the fixing portions of the plurality of winding pulleys in a rotation direction, so as to allow adjustment of the respective unwound lengths of the plurality of wires.

DETAILED DESCRIPTION

With reference to the accompanying drawings, a description will be given of a sheet storage device 20 according to the present disclosure and an image forming system 100 that includes the sheet storage device 20.

Figure 1:
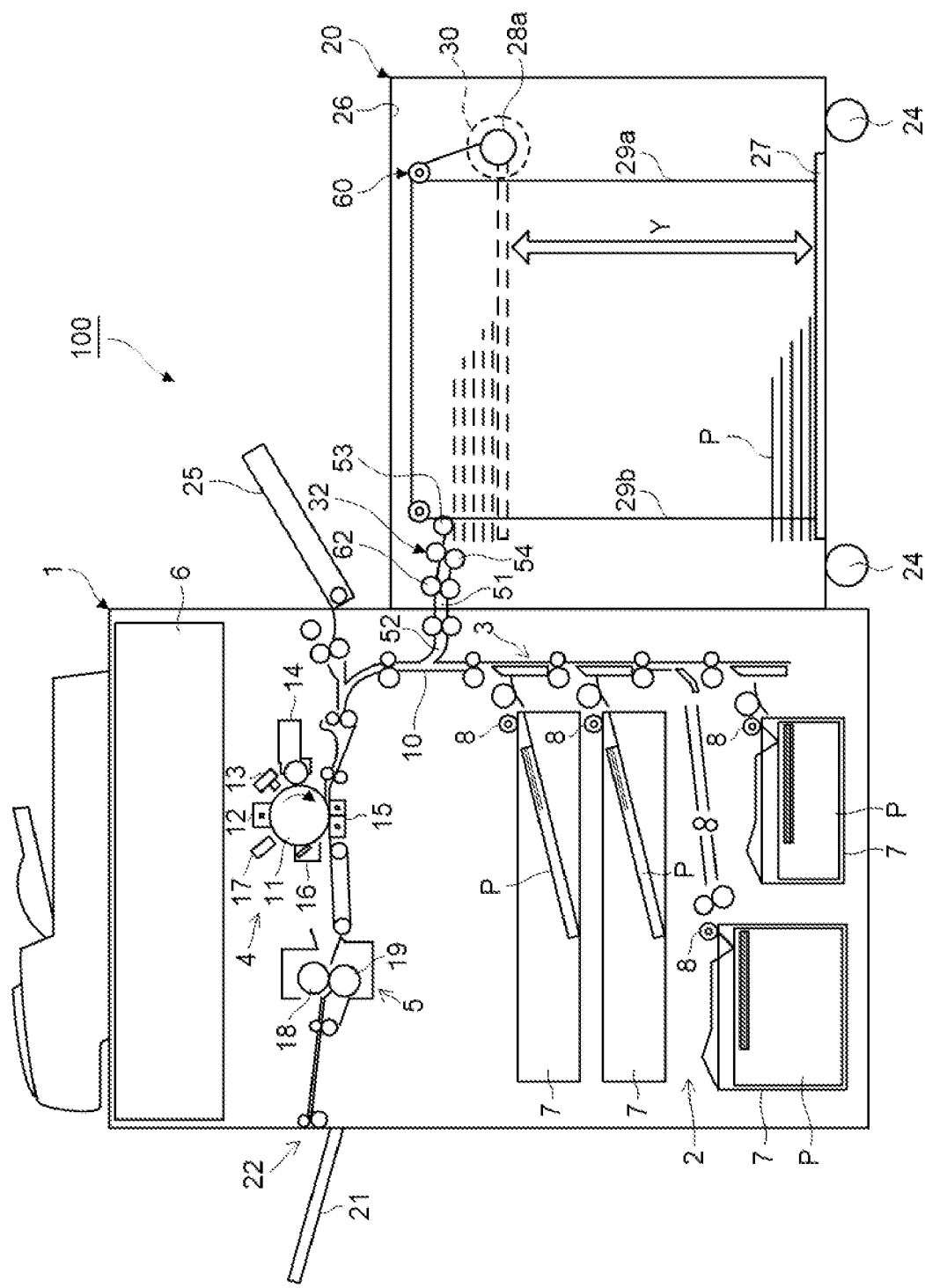
FIG. 1 is an outline sectional view showing an outline of the construction of an image forming system that includes a sheet storage device according to an embodiment of the present disclosure and an image forming apparatus.

FIG. 1 is an outline sectional view showing an outline of the construction of an image forming system 100 that includes the sheet storage device 20 according to the embodiment of the present disclosure and an image forming apparatus 1. The image forming apparatus 1 includes a sheet feed portion 2, a sheet conveyance portion 3, an image forming portion 4, a fixing device 5, and an image reading portion 6. The sheet feed portion 2 is disposed in a lower part of the image forming apparatus 1. The sheet conveyance portion 3 is disposed by the side of the sheet feed portion 2. The image forming portion 4 is disposed over the sheet conveyance portion 3. The fixing device 5 is disposed on the discharge side of the image forming portion 4. The image reading portion 6 is disposed over the image forming portion 4 and the fixing device 5.

The sheet feed portion 2 includes a plurality of sheet feed cassettes 7 that store sheets P of plain paper. As a sheet feed roller 8 rotates, the sheet feed portion 2 feeds out the sheets P one by one reliably from a selected one of the plurality of sheet feed cassettes 7.

A hand feed tray 25 is for stacking, and for feeding out to the sheet conveyance portion 3, sheets of pain paper of a size different from the sizes of the sheets P stored in the sheet feed cassettes 7, or OHP sheets, or sheets like envelopes.

A sheet P fed to the sheet conveyance portion 3 is conveyed through a sheet feed passage 10 toward the image forming portion 4. The sheet feed passage 10 extends upward from the sheet feed cassettes 7, and midway meets a confluence passage 52 that is connected to a sheet discharge port 51 (described later) of the sheet storage device 20.

The image forming portion 4 forms a toner image on a sheet P by a electrophotographic process. The image forming portion 4 includes a photosensitive member 11 pivoted so as to be rotatable in the direction indicated by an arrow in FIG. 1, and further includes, around the photosensitive member 11 along its rotation direction, a charging portion 12, an exposure portion 13, a developing device 14, a transfer portion 15, a cleaning portion 16, and a destaticizing portion 17.

The charging portion 12 includes a charging wire supplied with a high voltage. When through corona discharge from this charging wire a predetermined potential is applied to the surface of the photosensitive member 11, the surface of the photosensitive member 11 is electrostatically charged uniformly. When light based on the image data of a document read by the image reading portion 6 is shone on the photosensitive member 11 from the exposure portion 13, the surface potential on the photosensitive member 11 is attenuated selectively from place to place, so that an electrostatic latent image is formed on the surface of the photosensitive member 11.

The developing device 14 then develops the electrostatic latent image on the surface of the photosensitive member 11, so that a toner image is formed on the surface of the photosensitive member 11. The toner image is transferred by the transfer portion 15 to the sheet P fed to between the photosensitive member 11 and the transfer portion 15.

The sheet P having the toner image transferred to it is conveyed toward the fixing device 5, which is disposed downstream of the image forming portion 4 in the sheet conveyance direction. In the fixing device 5, the sheet P is heated and pressed by a heating roller 18 and a pressing roller 18, so that the toner image is fused to be fixed to the sheet P. The sheet P having the toner image fixed to it is then discharged onto a discharge tray 21 by a pair of discharge rollers 22.

After the transfer in the transfer portion 15, the toner remaining on the surface of the photosensitive member 11 is removed by the cleaning portion 16, and the electric charge remaining on the surface of the photosensitive member 11 is eliminated by the destaticizing portion 17. The photosensitive member 11 is then electrostatically charged again by the charging portion 12, so that image formation continues in a similar manner.

By the side of the image forming apparatus 1, adjacent to it, a large-capacity sheet storage device 20 is disposed that can store several thousand sheets P. The sheet storage device 20 includes, inside a housing 26 that forms the body of the sheet storage device 20, a sheet stacking tray 27, a suspension mechanism 60, a first wire 29a, a second wire 29b, a third wire 29c, a fourth wire 29d, a driving device 30, and a sheet feed mechanism 32. The housing 26 is formed substantially in the shape of a rectangular parallelepiped. To the bottom surface of the housing 26, a plurality of casters 24 are fitted to allow easy transport of the sheet storage device 20.

Figure 2:
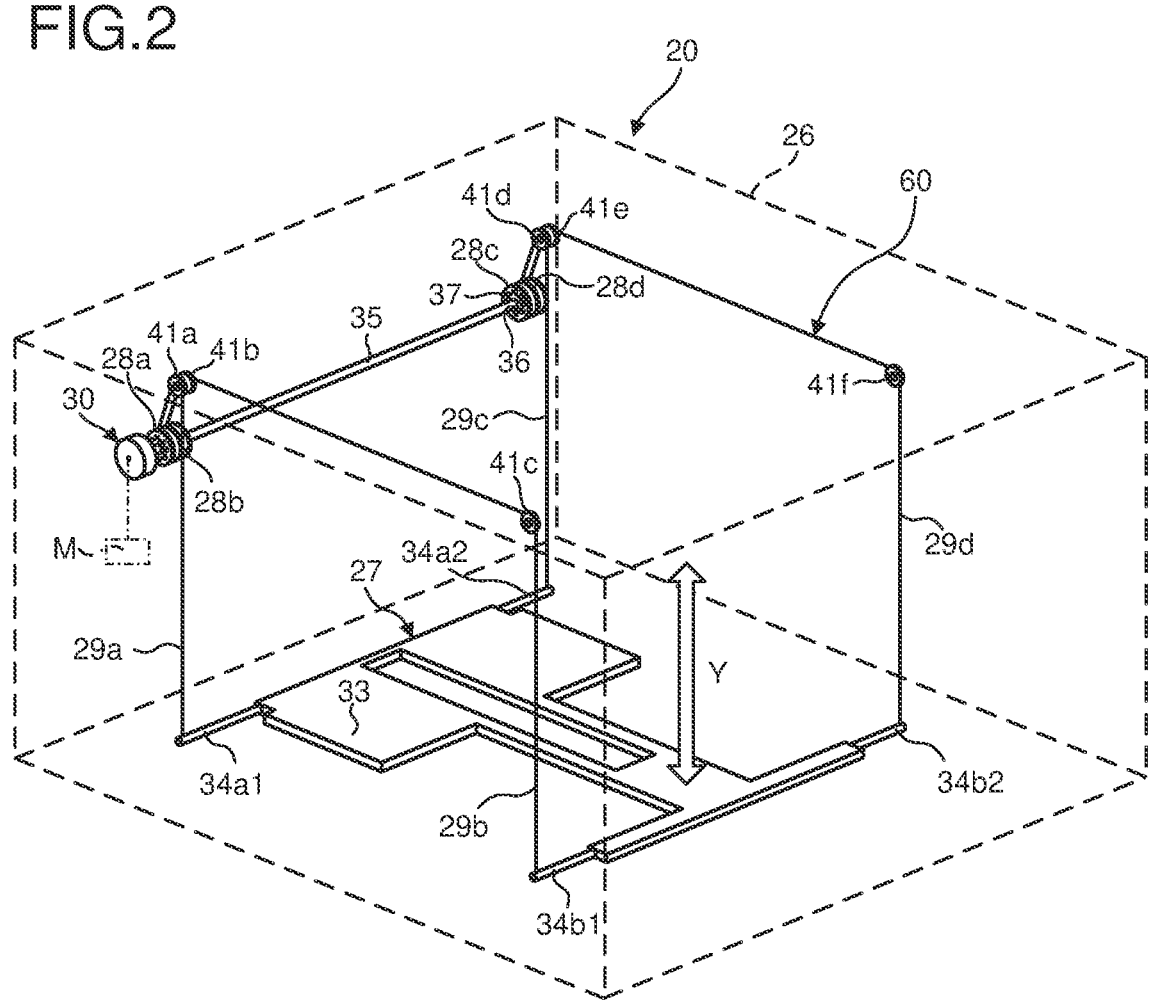
FIG. 2 is a perspective view showing the structure inside a housing of the sheet storage device.
Figure 3:
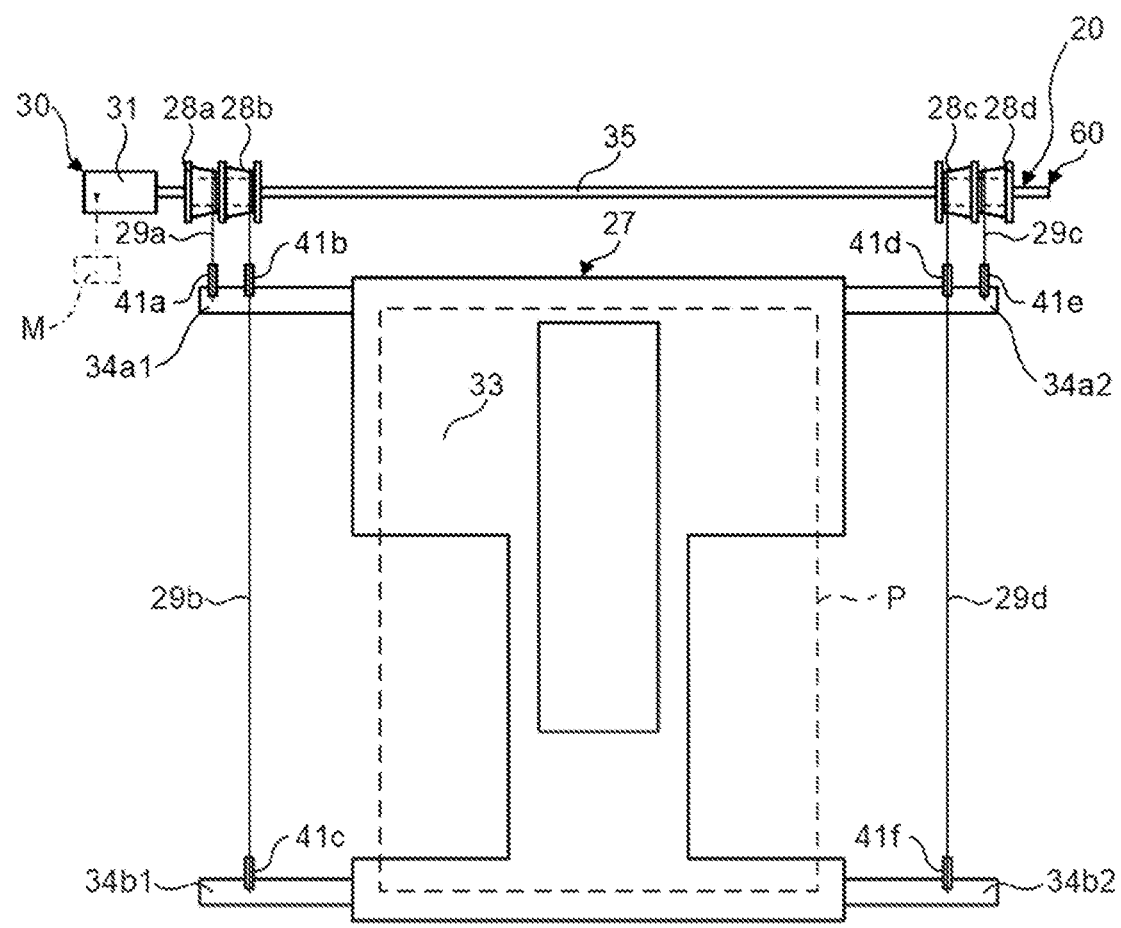
FIG. 3 is a plan view of the sheet storage device shown in FIG. 2 as seen from above.

FIG. 2 is a perspective view showing the structure inside the housing 26 of the sheet storage device 20. FIG. 3 is a plan view of the sheet stacking tray 27 shown in FIG. 2 as seen from above. The far right side surface of the housing 26 in FIG. 2 corresponds to the front side surface in FIG. 1 with respect to its plane. The near left side surface of the housing 26 in FIG. 2 corresponds to the rear side surface in FIG. 1 with respect to its plane. The width direction of the sheets P stored in the sheet storage device 20 points in the same direction as the direction from the front to the rear of the housing 26.

As shown in FIGS. 2 and 3, the sheet stacking tray 27 includes a tray portion 33, which is a plate-shaped member in a rectangular shape extending parallel to the horizontal plane, and fixing portions 34a1, 34a2, 34b1, and 34b2 (upstream fixing portions and downstream fixing portions), which protrude from the four corners of the tray portion 33 outward in its width direction (the width direction of the sheets P). The sheet stacking tray 27 is supported inside the housing 26 so as to be able to lift up and down along the up-down direction (direction indicated by arrow Y FIG. 2). The sheets P are stacked on a central part (at the position indicated by broken line in FIG. 3) of the tray portion 33.

The fixing portions 34a1, 34a2, 34b1, and 34b2 include a pair of fixing portions 34a1 and 34a2 (upstream fixing portions) that are located in an upstream end part of the tray portion 33 with respect to the sheet conveyance direction and a pair of fixing portions 34b1 and 34b2 (downstream fixing portions) that are located in a downstream end part of the tray portion 33 with respect to the sheet conveyance direction. The fixing portions 34a1 and 34a2 are disposed respectively at one side (at the front side (at the front side of the image forming apparatus 1)) and at the other side (at the rear side (at the rear side of the image forming apparatus 1)) along the axial direction. The fixing portions 34b1 and 34b2 are disposed respectively at one side (at the front side (at the rear side of the image forming apparatus 1)) and at the other side (at the rear side (at the rear side of the image forming apparatus 1)) along the axial direction.

The suspension mechanism 60 suspends the sheet stacking tray 27 via a plurality of (here, four) wires 29a to 29d (the first, second, third, and fourth wires 29a, 29b, 29c, and 29d) such that the sheet stacking tray 27 is able to lift up and down inside the housing 26. The suspension mechanism 60 includes a shaft 35, a plurality of pulleys 28a to 28d (winding pulleys), and sheaves 41a to 41f. The plurality of pulleys 28a to 28d will be referred to individually as the first pulley 28a (front pulley), the second pulley 28b (fixing portion), the third pulley 28c (rear pulley), and the fourth pulley 28d (rear pulley).

The shaft 35 extends along a horizontal direction (the width direction of the sheets P) orthogonal to the ascent-descent direction of the sheet stacking tray 27. The shaft 35 is supported inside the housing 26 so as to be rotatable in forward and reverse directions (clockwise and counterclockwise about the center axis of the shaft 35 as a rotation axis). The shaft 35 is fitted, at its opposite ends with respect to the direction (hereinafter referred to as the "axial direction") along the rotation axis of the shaft 35, with a plurality of pulleys 28a to 28d (here, four pulleys, namely the first, second, third, and fourth pulleys 28a, 28b, 28c, and 28d).

To an end part of the shaft 35 at one side in the axial direction (an end part at the rear side of the image forming apparatus 1), a driving device 30 is connected. The driving device 30 includes a drive portion M, such as a motor, that can apply a rotative driving force and a drive input gear 31 that is connected to the drive portion M and the shaft 35. The drive input gear 31 is composed of a plurality of gears, and transmits the rotative driving force of the drive portion M to the shaft 35. The driving device 30 makes the drive portion M generate a rotative driving force in a forward or reverse direction, and thereby makes, via the drive input gear 31, the shaft 35 rotate in a forward or reverse direction.

As shown in FIGS. 2 and 3, to an end part of the shaft 35 at one side in the axial direction (an end part at the rear side of the image forming apparatus 1), inward of the driving device 30 in the axial direction, the first and second pulleys 28a and 28b are fitted. To an end part of the shaft 35 at the other side (opposite from the one side mentioned above) in the axial direction (an end part at the front side of the image forming apparatus 1), the third and fourth pulleys 28c and 28d are fitted.

The pulleys 28a to 28d are located coaxially with respect to the shaft 35. The first and second pulleys 28a and 28b are adjacent to and in contact with each other in the axial direction. The first pulley 28a is located outward of the second pulley 28b in the axial direction. The third and fourth pulleys 28c and 28d are adjacent to and in contact with each other in the axial direction. The third pulley 28c is located inward of the fourth pulley 28d in the axial direction. The pulleys 28a, to 28d are members that are separate from each other, and are separable from each other.

To the first pulley 28a, one end of the first wire 29a is fixed. To the second pulley 28b, one end of the second wire 29b is fixed. To the third pulley 28c, one end of the third wire 29c is fixed. To the fourth pulley 28d, one end of the fourth wire 29d is fixed. As the pulleys 28a to 28d rotate in the forward direction, the wires 29a to 29d that are fixed with respect to those pulleys 28a to 28d are wound up. By contrast, as the pulleys 28a to 28d rotate in the reverse direction, the wires 29a to 29d that are fixed with respect to those pulleys are unwound out.

Figure 4:
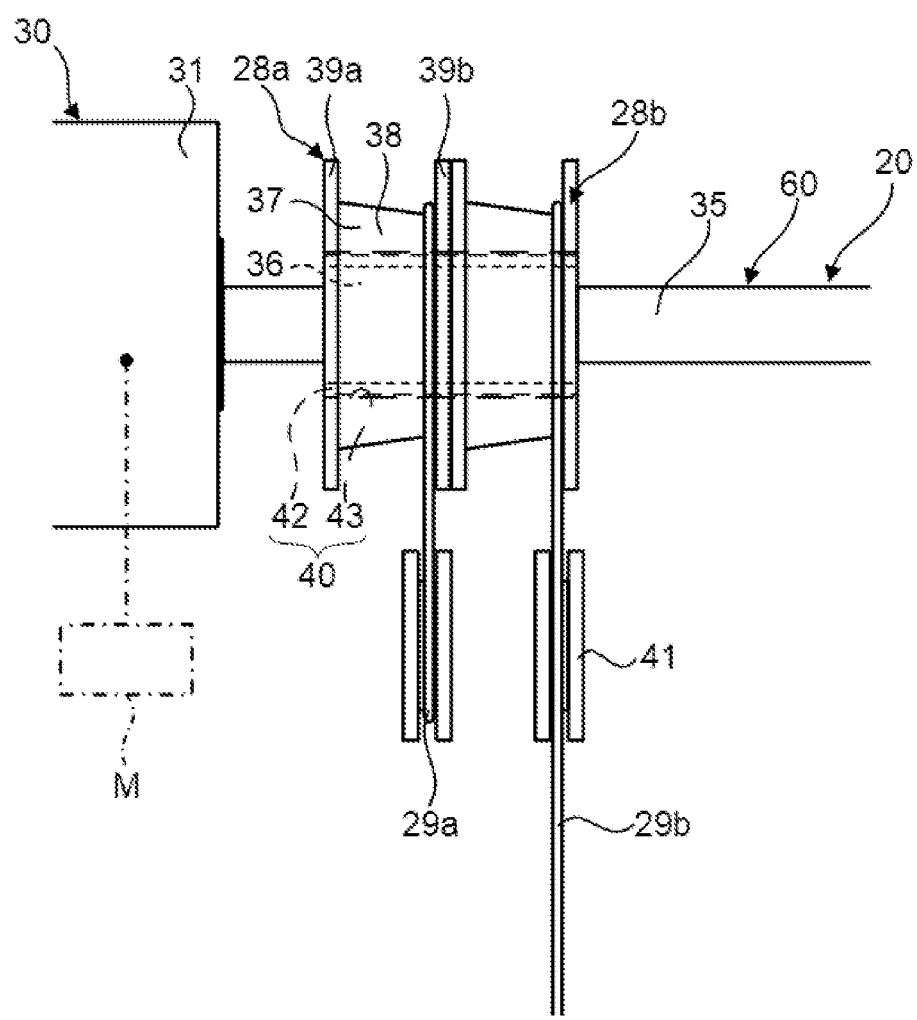
FIG. 4 is a plan view around an end part of a shaft at one side.
Figure 5:
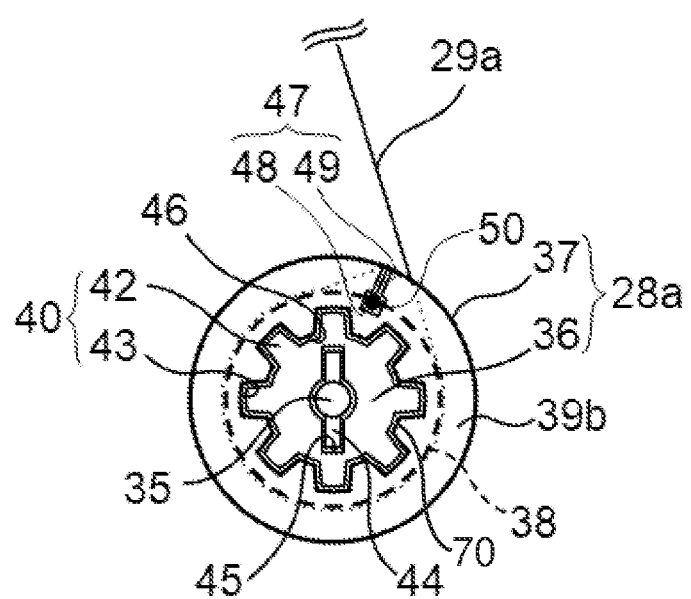
FIG. 5 is a plan view of a first pulley as seen from inward of it in the axial direction.
Figure 6:
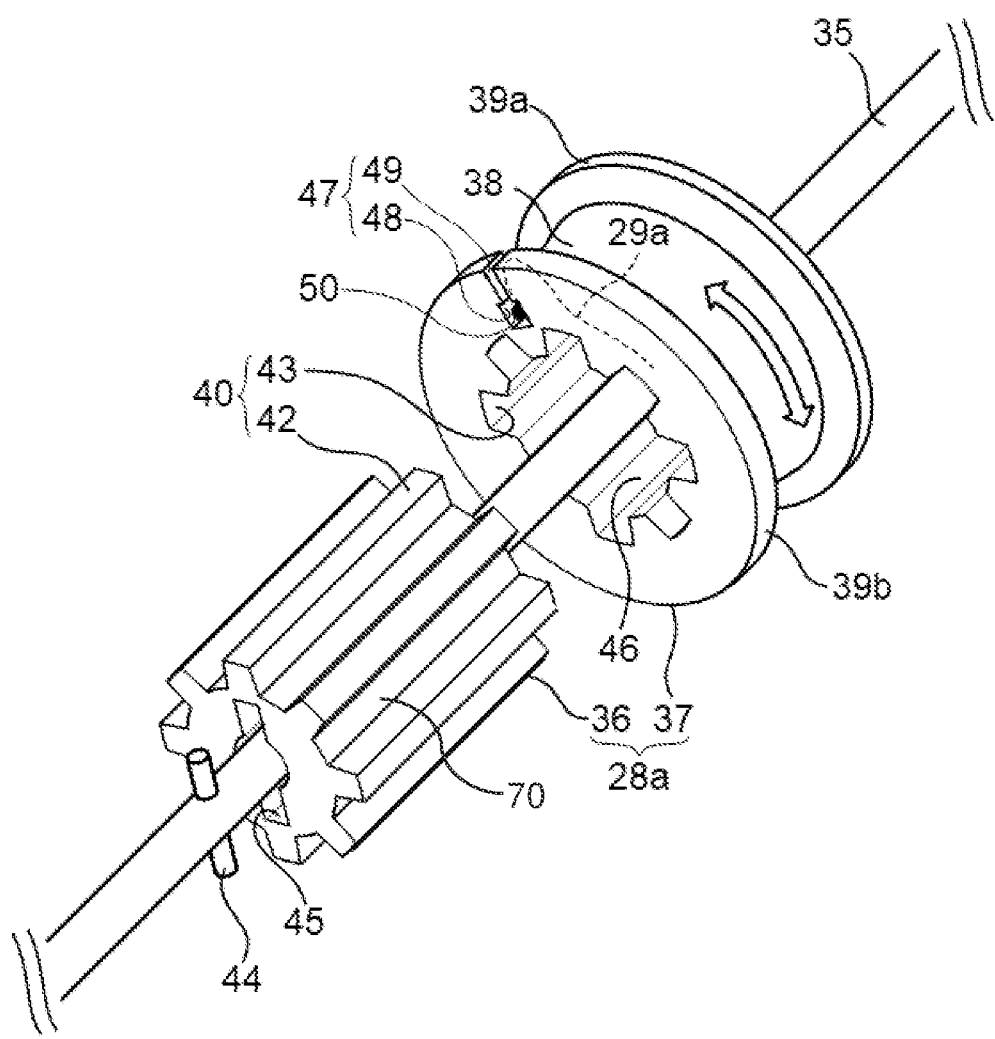
FIG. 6 is a perspective view of the first pulley, showing its structure exploded.

FIG. 4 is a plan view around an end part of the shaft 35 at one side. FIG. 5 is a plan view of the first pulley 28a as seen from inward of it in the axial direction. FIG. 6 is an exploded perspective view of the first pulley 28a. The pulleys 28a to 28d are identically shaped and identically structured; accordingly only the first pulley 28a will be described in detail below, and for the other pulleys (second, third, and fourth pulleys 28b, 28c, and 28d), the same reference signs will be shared, with no overlapping description repeated.

As shown in FIGS. 4, 5, and 6, the first pulley 28a includes a driving gear 36 and a driven gear 37 located coaxially with the shaft 35 and a locking mechanism 40 disposed between the driving and driven gears 36 and 37.

The driving gear 36 is a external gear that has a plurality of projections 42 formed on its outer circumferential surface 70. The driving gear 36 is at its center in the diametrical direction penetrated by the shaft 35. The shaft 35 is restrained from rotating relative to the shaft 35. The projections 42 are arranged at equal intervals in the circumferential direction.

Here, at a position overlapping the driven gear 37 with respect to the axial direction, an anti-rotation pin 44 is provided that penetrates the shaft 35 in the diametrical direction (see FIG. 6). The anti-rotation pin 44 is supported so as to be insertable in and removable from the shaft 35. In an end surface of the driving gear 36 at one side in the axial direction, a positioning groove 45 is formed in which the anti-rotation pin 44 can be fitted. The width of the positioning groove 45 is slightly greater than the diameter of the anti-rotation pin 44. The length and depth of the positioning groove 45 are greater than the length and diameter, respectively, of the anti-rotation pin 44.

With the anti-rotation pin 44 fitted in the positioning groove 45, as the shaft 35 rotates, the outer circumferential surface of the anti-rotation pin 44 makes contact with the inner wall of the positioning groove 45. This restrains relative rotation between the shaft 35 and the driving gear 36 (these are restrained from rotating relative to each other), and the shaft 35 and the driving gear 36 rotate together. The driving gear 36 and the shaft 35 may be bonded together with adhesive or the like, or may be engaged together so as to be attachable and detachable through engagement of the positioning groove 45 with the anti-rotation pin 44, by press-fitting the anti-rotation pin 44 into the positioning groove 45. The anti-rotation pin 44 is provided at the position overlapping the driven gear 37 of each of the pulleys 28a to 28d.

As shown in FIGS. 4, 5, and 6, the driven gear 37 has a winding portion 38 that is located in the middle of the first pulley 28a in the axial direction, an outer flange 39a formed in an end part of the winding portion 38 at one side in the axial direction (outward in the axial direction), and an inner flange 39b formed in an end part of the winding portion 38 at the other side in the axial direction (inward in the axial direction). At the center of the driven gear 37 in the diametrical direction, a shaft bore 46 is formed that penetrates it in the axial direction.

The first pulley 28a winds up the first wire 29a such that the first wire 29a is wound around the outer circumferential surface of the winding portion 38. The winding portion 38 has a tapered shape such that its outer diameter increases toward one side in the axial direction (outward in the axial direction).

In the inner circumferential surface of the shaft bore 46, a plurality of recesses 43 are formed that are arranged at equal intervals in the circumferential direction. The width of the recess 43 (the distance between the inner walls of adjacent recesses 43 in the circumferential direction) is slightly greater than the width of the projection 42 on the driving gear 36. The depth of the recess 43 (its dimension in the radial direction) is slightly greater than the height of the recess 43 (its dimension in the radial direction). The projections 42 on the driving gear 36 and the recesses 43 in the driven gear 37 constitute the locking mechanism 40 (drive transmission portion).

The locking mechanism 40 restrains relative rotation between the driving gear 36 and the driven gear 37. Specifically, the driving gear 36 fits in the shaft bore 46 with the projections 42 on the driving gear 36 fitted in the recesses 43 in the driven gear 37. As the shaft 35 and the driving gear 36 rotate, the projections 42 and the recesses 43 make contact with each other in the circumferential direction, and this restrains relative rotation between the driving gear 36 and the driven gear 37 (these are restrained from rotating relative to each other). Thus the driving gear 36 and the driven gear 37 engage together and rotate together.

The restraint position (engagement position) of relative rotation between the driven gear 37 is determined by the fitting position between the driven gear 37 and the driving gear 36 in the circumferential direction. That is, since the recesses 43 are located next to each other in the circumferential direction and the projections 42 too are located next to each other in the circumferential direction, in accordance with which of the projections 42 fits in which of the recesses 43, the restraint position of the driven gear 37 with respect to the driving gear 36 varies.

To change the restraint position of the driven gear 37, with the driving gear 36 pulled out of the shaft bore 46 (with restraint on rotation removed), the driven gear 37 is rotated relative to the driving gear 36. That is, the rotation angle (phase) of the driven gear 37 relative to the driving gear 36 is changed. The rotation angle is equal to the angles at which the recesses 43 are located next to each other. With the rotation angle of the driven gear 37 changed, the driving gear 36 is inserted into the shaft bore 46. In this way, changing the restraint position (engagement position) of the driven gear 37 permits the unwound length of the first wire 29a to be changed.

As shown in FIGS. 5 and 6, in the inner flange 39b of the first pulley 28a, a locking groove 47 is formed to which an end part of the first wire 29a is locked. The locking groove 47 has a locking hole 48 that is recessed in a square shape from the inner end surface of the inner flange 39b in the axial direction outward in the axial direction and a cut portion 49 that extends in the radial direction from the locking hole 48 to reach the outer circumferential surface of the inner flange 39b. Here, at one end of the first wire 29a, a hook portion 50 in a spherical shape is formed. The width, length, and depth of the locking hole 48 are greater than the diameter of the hook portion 50. The locking hole 48 permits the hook portion 50 to fit into it. The width of the cut portion 49 is smaller than the diameter of the hook portion 50, and greater than the thickness of the first wire 29a. The hook portion 50 fits in the locking hole 48, and the first wire 29a fits in the cut portion 49.

Since the width of the cut portion 49 is smaller than the diameter of the hook portion 50, even if the first wire 29a is pulled in the direction of its end opposite from the hook portion 50, the hook portion 50 is caught on the inner wall of the locking hole 48 and cannot pass through the cut portion 49. This helps prevent one end of the first wire 29a from coming out of the locking groove 47. The hook portion 50 can be so configured that it is fixed by being press-fitted into the locking hole 48. Instead, the hook portion 50 may be so configured that it is bonded to the locking hole 48 with adhesive or the like. The driven gear 37 may be so configured as to include a lid member that covers an end surface of the inner flange 39b so that, with that lid member, the hook portion 50 is locked in the locking hole 48. In that case, the lid member is structured so as not to overlap the shaft bore 46.

Referring back to FIGS. 1, 2, and 3, as described above, one ends of the wires 29a to 29d (first, second, third, and fourth wires 29a, 29b, 29c, and 29d) are fixed to the pulleys 28a to 28d (first, second, third, and fourth pulleys 28a, 28b, 28c, and 28d). The other ends of the wires 29a to 29d are fixed to the fixing portions 34a1, 34a2, 34b1, and 34b2 of the sheet stacking tray 27. Between one and the other ends of the wires 29a to 29d, the sheaves 41a to 41f are disposed. The wires 29a to 29d suspend the sheet stacking tray 27 via the sheaves 41a to 41f.

The sheaves 41a to 41f are rotatably supported at a position above the pulleys 28a to 28d (see FIG. 2). The sheaves 41a to 41c are disposed at one side (at the rear side of the housing 26) of the tray portion 33 of the sheet stacking tray 27 with respect to the axial direction, and the sheaves 41d to 41f are disposed at the other side (at the front side of the housing 26) of the tray portion 33 of the sheet stacking tray 27 with respect to the axial direction.

The other end of the first wire 29a (its end opposite from its end fixed to the first pulley 28a) is fixed to the fixing portion 34a1 (upstream fixing portion at the front side) located at the rear side of the housing 26. The other end of the second wire 29b (its end opposite from its end fixed to the second pulley 28b) is fixed to the fixing portion 34b1 (downstream fixing portion at the front side) located at the rear side of the housing 26. The other end of the first wire 29a is fixed to the fixing portion 34a1 at the side closer to the first and second pulleys 28a and 28b (at the side farther from the image forming apparatus 1) than the other end of the second wire 29b.

The other end of the third wire 29c is fixed to the fixing portion 34a2 (upstream fixing portion at the rear side) located at the front side of the housing 26. The other end of the fourth wire 29d is fixed to the fixing portion 34b2 (downstream fixing portion at the rear side) located at the front side of the housing 26. The other end of the third wire 29c is fixed to the fixing portion 34a2 at the side closer to the third and fourth pulleys 28c and 28d (at the side farther from the image forming apparatus 1) than the other end of the fourth wire 29d.

The first wire 29a extends from the first pulley 28a upward to be hooked on the sheave 41a, and extends from the sheave 41a vertically downward to suspend the sheet stacking tray 27. The second wire 29b extends from the second pulley 28b upward to be hooked on the sheave 41b, and extends from the sheave 41b horizontally downstream in the sheet conveyance direction to be hooked on the sheave 41c, Which is located farther from the second pulley 28b than the sheave 41b, to suspend the sheet stacking tray 27.

The third wire 29c extends from the third pulley 28c upward to be hooked on the sheave 41d, and extends from the sheave 41d vertically downward to suspend the sheet stacking tray 27. The fourth wire 29d extends from the fourth pulley 28d upward to be hooked on the sheave 41e, and extends from the sheave 41e horizontally upstream in the sheet conveyance direction to be hooked on the sheave 41f, which is located farther from the fourth pulley 28d than the sheave 41e, to suspend the sheet stacking tray 27.

With the weight of the sheet stacking tray 27 and the sheets P, the wires 29a to 29d applies to the suspension mechanism 60 a suspension load, which is a load acting vertically downward. The suspension load via the sheaves 41a to 41f acts as a rotative force that rotates the pulleys 28a to 28d in the reverse direction. It is assumed that, when the user presses down the sheet stacking tray 27, the pressing force adds to the suspension load.

Referring back to FIG. 1, in an upper part of the housing 26, a sheet feed mechanism 32 is disposed that feeds sheets P downstream in the sheet conveyance direction. The sheet feed mechanism 32 includes a pickup roller 53, a pair of sheet feed rollers 54, a pair of conveyance rollers 62, and a sheet discharge port 51. The pickup roller 53 is located above the sheet stacking tray 27, at a position where it makes contact with the top surface of the stacked sheets P as the sheet stacking tray 27 ascends. When the pickup roller 53, in contact with the top surface of the sheets P, rotates in the feeding direction (clockwise in FIG. 1), one sheet P at the top of the stack of sheets P is fed out.

The pair of sheet feed rollers 54 are disposed opposite each other, downstream of the pickup roller 53 with respect to the sheet conveyance direction. The pair of conveyance rollers 62 are disposed opposite each other, downstream of the pair of sheet feed rollers 54 with respect to the sheet conveyance direction. The sheet discharge port 51 is located in a downstream end part of the sheet feed mechanism 32 with respect to the sheet conveyance direction, and is open in a side surface of the housing 26. A sheet P fed downstream by the pickup roller 53 is conveyed further downstream by the pair of sheet feed rollers 54 and the pair of conveyance rollers 62, and is discharged via, the sheet discharge port 51 out of the sheet storage device 20. As mentioned above, to the sheet discharge port 51, the confluence passage 52 of the image forming apparatus 1 is connected. Thus the sheet P discharged via the sheet discharge port 51 is introduced through the confluence passage 52 into the sheet feed passage 10, is then conveyed to the image forming portion 4 inside the image forming apparatus 1, and undergoes image formation as described above.

Figure 7:
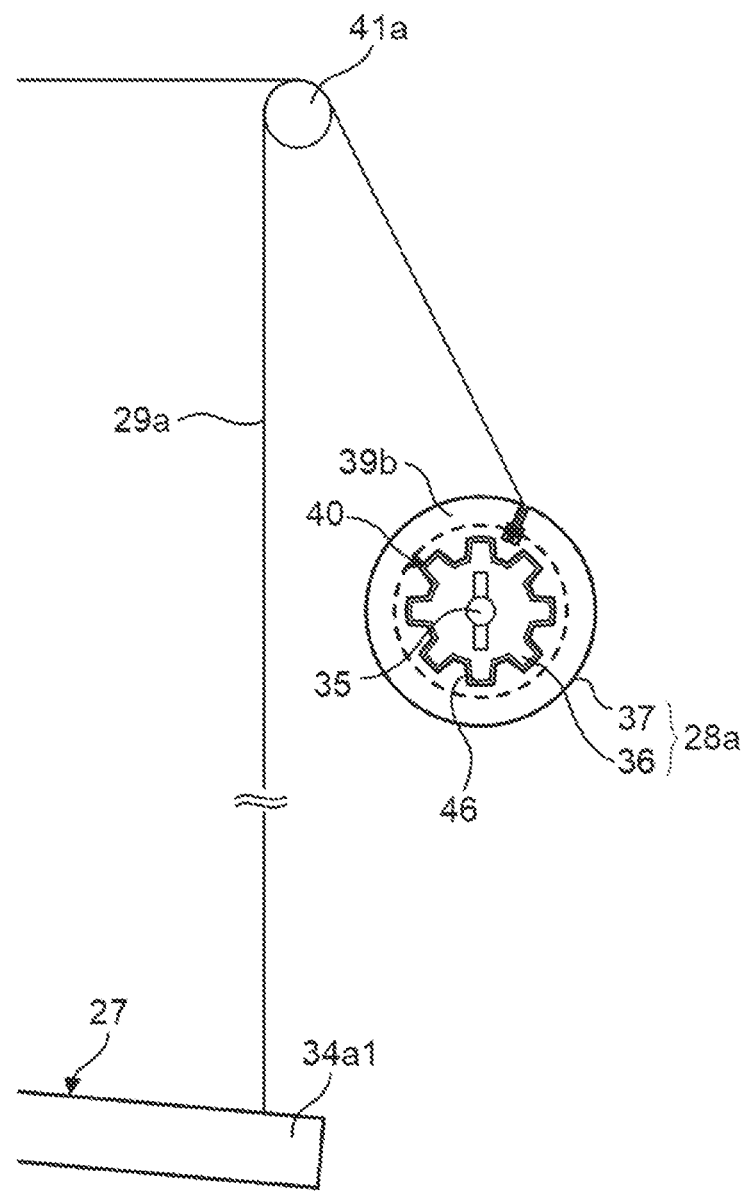
FIG. 7 is a side view of a suspension mechanism suspending the sheet stacking tray in an inclined state.
Figure 8:
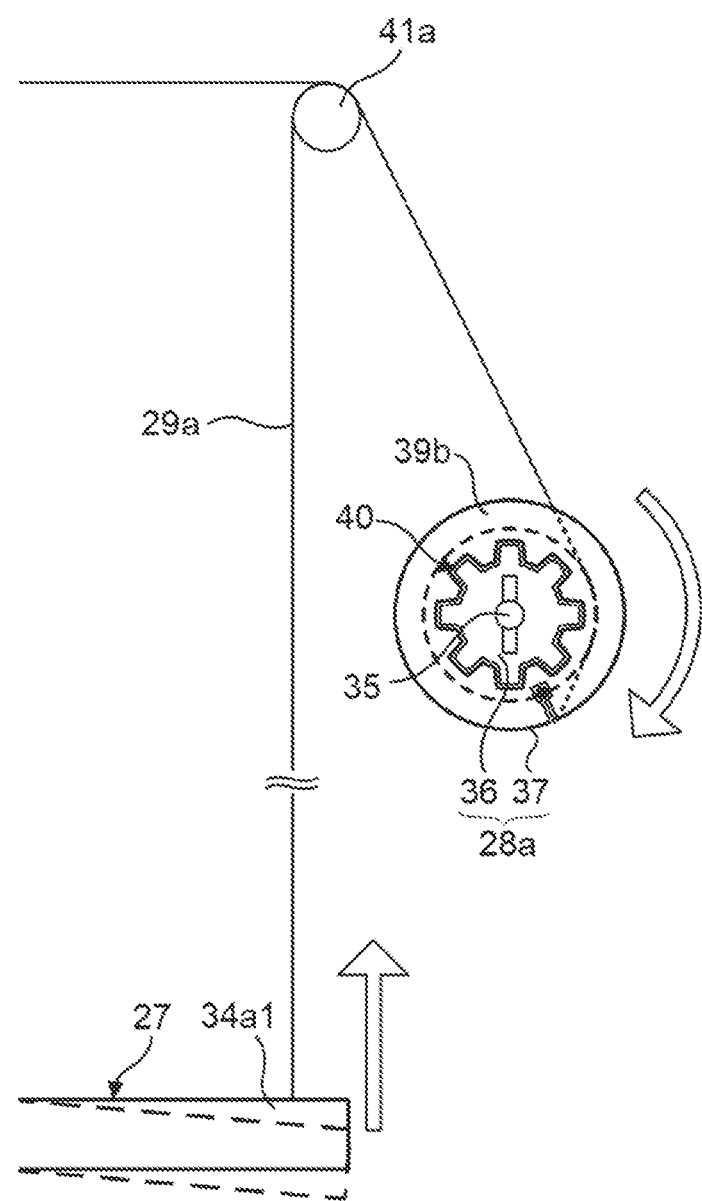
FIG. 8 is a side view of the suspension mechanism in a state where, as a result of the driven gear shown in FIG. 7 being rotated through a predetermined angle in the forward direction, the unwound length has been reduced.

Next, a description will be given of adjustment of the unwound lengths of the wires 29a to 29d. FIG. 7 is a side view of the suspension mechanism 60 suspending the sheet stacking tray 27 in an inclined state. FIG. 8 is a side view of the suspension mechanism 60 in a state where, as a result of the driven gear 37 shown in FIG. 7 being rotated through a predetermined angle in the forward direction, the unwound length of the first pulley 28a has been reduced.

As shown in FIG. 7, if due to deformation of the sheet stacking tray 27 or for some other reason the unwound length of the first wire 29a from the first pulley 28a is greater than the unwound lengths of the other wires 29b to 29d (second, third, and fourth wires 29b, 29c, and 29d) from the other pulleys 28b to 28d (second, third, and fourth pulleys 28b, 28c, and 28d), the sheet stacking tray 27 inclines. In this case, the driving gear 36 is pulled out of the shaft bore 46 in the driven gear 37 to remove restraint on relative rotation between the driving and driven gears 36 and 37, and the driven gear 37 is rotated through a predetermined angle in the forward direction (winding direction of the wire). Then the projections 42 are fitted in the recesses 43 to fit the driving gear 36 in the shaft bore 46 in the driven gear 37 so that relative rotation between the driving and driven gears 36 and 37 is restrained by the locking mechanism 40. In this way, as shown in FIG. 8, the unwound length of the first wire 29a is reduced and the inclination of the sheet stacking tray 27 is eliminated.

By contrast, if the unwound length of the first wire 29a from the first pulley 28a is smaller than the unwound lengths of the other wires 29b to 29d from the other pulleys 28b to 28d, in a similar manner as described above, restraint on relative rotation between the driving and driven gears 36 and 37 is removed for a while, then the driven gear 37 is rotated through a predetermined angle in the reverse direction (unwinding direction of the wire), and then relative rotation between the driving and driven gears 36 and 37 is restrained. In this way, the unwound length of the first wire 29a is increased and the inclination of the sheet stacking tray 27 is eliminated.

As described above, according to the embodiment, the driven gear 37 is restrained from rotating relative to the driving gear 36 at a predetermined restraint position selected from a plurality of restraint positions. Thus, by setting the restraint position of the driven gear 37 of each of the individual pulleys 28a to 28d, it is possible to adjust the unwound length of each of the wires 29a to 29d.

As described above, the one ends of the wires 29a to 29d are fixed to the driven gear 37, and the unwound lengths of the wires 29a to 29d change with the rotation angle of the pulleys 28a to 28d, that is, the rotation angle of the driven gears 37. The plurality of restraint positions are located next to each other in the circumferential direction, and thus changing the restraint position of the driven gear 37 results in changing the rotation angle of the driven gear 37. Thus, by changing the restraint position of the driven gear 37 of the pulleys 28a to 28d, it is possible to give different rotation angles to the driven gear 37 of the pulleys 28a to 28d. In this way it is possible to adjust the unwound length of each of the individual wires 29a to 29d. Even if, as mentioned above, the sheet stacking tray 27 is inclined, by adjusting the unwound lengths of each of the individual wires 29a to 29d, it is possible to set the sheet stacking tray 27 back into the horizontal state. It is thus possible to provide a sheet storage device 20 that is less prone to sheet feed failure.

As described above, the winding portion 38 has a tapered shape such that its outer diameter increases to one side in the axial direction (outward in the axial direction). Thus, when the wires 29a to 29d are wound around the winding portion 38 of the pulleys 28a to 28d, they are wound around it starting at an outer end part of the winding portion 38 in the axial direction. Thus the wires 29a to 29d are wound up flat from an outer to an inner end part of the winding portion 38 in the axial direction, and are less prone to entangling.

The embodiment specifically described above is not meant to limit the scope of the present disclosure, which thus allows for various modifications without departure from the spirit of the present disclosure. For example, while the above description deals with an example where a plurality of projection 42 are formed on the outer circumferential surface 70 of the driving gear 36, this is not meant as any limitation; any configuration is instead possible where any number of projections 42 equal to or greater than one but smaller than the number of recesses 43 are formed on the outer circumferential surface 70 of the driving gear 36.

The present disclosure finds applications in large-capacity sheet storage devices that can store sheets to be supplied to an image forming apparatus. Based on the present disclosure, it is possible to suppress failure in sheet feeding from a sheet storage device to an image forming apparatus.

What is claimed is:

1. A sheet storage device comprising:
   a housing;
   a sheet stacking tray that is supported inside the housing so as to be able to lift up and down in a lifting direction and on which a sheet is stacked;
   a shaft that extends in a direction orthogonal to the lifting direction and that is supported so as to be rotatable in forward and reverse directions;
   a suspension mechanism including:
   a plurality of winding pulleys fitted at opposite ends of the shaft; and
   a plurality of wires of which one ends are respectively fixed to the plurality of winding pulleys and of which other ends are fixed to the sheet stacking tray so as to suspend the sheet stacking tray;
   a driving device that rotates the shaft; and
   a drive transmission portion that transmits rotation of the shaft to the plurality of winding pulleys,
   wherein the drive transmission portion includes:
a plurality of driving gears that are respectively fixed at positions corresponding to the plurality of winding pulleys on the shaft and that rotate together with the shaft; and
a plurality of driven gears that are respectively formed on the plurality of winding pulleys and that engage with corresponding ones of the plurality of driving gears to transmit the rotation of the shaft to the plurality of winding pulleys,
the plurality of driving gears are each an external gear that has teeth formed on an outer circumferential surface of a cylindrical portion extending in an axial direction of the shaft,
the plurality of driven gears are each an internal gear that has teeth formed in an inner circumferential surface of a shaft bore recessed along the axial direction from end parts the plurality of winding pulleys in the axial direction,
between each of the plurality of driving gears and the corresponding one of the plurality of driven gears, the teeth formed on the outer circumferential surface of the cylindrical portion engage with the teeth formed in the inner circumferential surface of the shaft bore, and engagement positions of the plurality of driven gears with respect to the plurality of driving gears can be changed in a circumferential direction of the shaft,
the plurality of winding pulleys each have:
  fixing portions to which an end part of one of the plurality of wires is fixed: and
  a winding portion around which one of the plurality of wires is wound up, the winding portion having a cylindrical shape
the drive transmission portion changes the respective engagement positions of the plurality of driven gears and thereby changes respective relative positions of the fixing portions of the plurality of winding pulleys in a rotation direction, so as to allow adjustment of respective unwound lengths of the plurality of wires.

2. The sheet storage device according to claim 1, wherein the plurality of driving gears are disposed one in each of end parts of the shaft,
the plurality of winding pulleys are disposed two, adjacent to each other, in each of the end parts of the shaft, and
in each of the end parts of the shaft, the internal gears of two of the plurality of winding pulleys respectively engage with the external gear of one of the plurality of driving gears.

3. The sheet storage device according to claim 1, wherein the plurality of wires include four wires,
the plurality of winding pulleys include four winding pulleys to which the four wires are respectively fixed,
the four winding pulleys each include:
two front pulleys disposed adjacent to each other in a front end part of the shaft in the axial direction; and
two rear pulleys disposed adjacent to each other in a rear end part of the shaft in the axial direction,
the sheet stacking tray has:
a pair of upstream fixing portions located in a front end part and a rear end part, in the axial direction, of an upstream end part, with respect to a sheet conveyance direction, of the sheet stacking tray; and
a pair of downstream fixing portions located in a front end part and a rear end part, in the axial direction, of a downstream end part, with respect to the sheet conveyance direction, of the sheet stacking tray, and
the four wires includes:
a first wire of which one end is fixed to one of the two front pulleys and of which another end is fixed to the upstream fixing portion in the front end part;
a second wire of which one end is fixed to another of the two front pulleys and of which another end is fixed to the downstream fixing portion in the front end part;
a third wire of which one end is fixed to one of the two rear pulleys and of which another end is fixed to the upstream fixing portion in the rear end part; and
a fourth wire of which one end is fixed to another of the two rear pulleys and of which another end is fixed to the downstream fixing portion in the rear end part.

4. The sheet storage device according to claim 1, wherein the outer circumferential surface of the winding portion has a tapered shape such that an outer diameter of the winding portion increases outward in an axial direction of the shaft.

5. The sheet storage device according to claim 4, wherein the plurality of winding pulleys each has a flange formed on the winding portion, and
the fixing portions are each formed by cutting off a part of the flange.

6. The sheet storage device according to claim 5, wherein each of the plurality of wires has, at an end part thereof, a hook portion having a spherical shape, and
each of the fixing portions has:
a locking groove through which the plurality of wires can respectively pass; and
a locking hole that is formed in an end part of the locking groove and in which the hook portion is locked.

7. An image forming system comprising:
an image forming apparatus including an image forming portion that forms an image on the sheet; and
the sheet storage device according to claim 1 including a sheet feed mechanism that is connected to the image forming apparatus and that feeds the sheet to the image forming portion.

* * * * *